United States Patent [19]

Yamaguchi et al.

[11] 4,202,958
[45] May 13, 1980

[54] PROCESS FOR THE PREPARATION OF POLYOLEFINS USING A REDUCED VANADIUM HALIDE CATALYST

[75] Inventors: Kazuo Yamaguchi, Fujisawa; Toru Tanaka, Komae; Shigeaki Okano, Yamato; Nobuo Enokido, Tokyo; Masatoshi Suzuki, Fujisawa, all of Japan

[73] Assignee: Mitsubishi Chemical Industries, Ltd., Tokyo, Japan

[21] Appl. No.: 865,196

[22] Filed: Dec. 28, 1977

[30] Foreign Application Priority Data

Jan. 24, 1977 [JP] Japan ................................ 52/6511

[51] Int. Cl.$^2$ ................................................ C08F 4/68
[52] U.S. Cl. ........................... 526/142; 252/429 B; 526/127; 526/352
[58] Field of Search ............................ 526/142, 127

[56] References Cited

U.S. PATENT DOCUMENTS

| | | | |
|---|---|---|---|
| 3,116,274 | 12/1963 | Boehm et al. | 526/142 |
| 3,345,351 | 10/1967 | McCall et al. | 526/142 |
| 3,407,185 | 10/1968 | Natta et al. | 526/142 |

FOREIGN PATENT DOCUMENTS 50-19591  3/1975  Japan .

Primary Examiner—Stanford M. Levin
Attorney, Agent, or Firm—Stevens, Davis, Miller & Mosher

[57] ABSTRACT

A process for the preparation of polyolefins, polymerizing olefins with use of a solid catalyst separated from a reaction mixture which is obtained by reducing a halogen-containing compound of vanadium with an organic aluminum compound in the presence of an ether and an organic aluminum compound.

6 Claims, No Drawings

PROCESS FOR THE PREPARATION OF POLYOLEFINS USING A REDUCED VANADIUM HALIDE CATALYST

DETAILED DESCRIPTION OF THE INVENTION

This invention relates to a process for the preparation of polyolefins, and more particularly it relates to a process for the preparation of polyolefins by use of a highly active vanadium type olefin polymerization catalyst.

It is well known in the art to prepare an olefin polymerization catalyst by treating a transition-metal compound with an organic metal compound to synthesize a catalyst composition insoluble in hydrocarbon solvents, and combining therewith an organic metal compound.

There are also known other methods for similarly synthesizing said type of catalysts such as a method using a halogen-containing compound of vanadium. However, the products obtained from any of these known methods are relatively low in activity, and with a few exceptions, their use requires removal of the residual catalyst from the resulting polyolefins. It is generally acknowledged in the industry that if the polymer yield per catalyst is increased and the catalyst removal step is eliminated in the polymer preparation process, an appreciable reduction of production cost will be realized to greatly benefit the industry.

In view of this, the present inventors have made efforts to obtain a vanadium type olefin polymerization catalyst which is satisfactorily high in activity and capable of eliminating the need for any step for catalyst removal in the polymer preparation process, and finally arrived at this invention.

The invention is now described in detail. The halogen-containing compounds of vanadium used in the catalyst preparation according to this invention include, for example, the compounds of the formula: $VX_{4-n}Y_n$ (wherein X is a halogen atom, Y is an alkoxy group with 1 to 12, preferably 1 to 6 carbon atoms or trialkylsiloxy group ($-OSiR^3_3$ group where $R^3$ is an alkyl group with 1 to 12 carbon atoms), and n is a number defined by: $0 \leq n < 4$), and the compounds of the formula: $VOX_{3-m}Y_m$ (wherein X is a halogen atom, Y is an alkoxy group with 1 to 12, preferably 1 to 6 carbon atoms or trialkylsiloxy group ($-OSiR^3_3$ group wherein $R^3$ is an alkyl group with 1 to 12 carbon atoms), and m is a number defined by: $0 \leq m < 3$). More specified examples of compounds of the formula $VX_{4-n}Y_n$ include vanadium tetrachloride, vanadium tetrabromide, vanadium tetraiodide, mono-n-butoxyvanadium trichloride and di-n-butoxyvanadium dichloride, and those of the compounds of the formula $VOX_{3-m}Y_m$ include vanadyl trichloride, vanadyl tribromide, di-n-butoxychlorovanadyl, diisopropoxymonochlorovanadyl, mono-n-butoxydichlorovanadyl, monoisopropoxydichlorovanadyl and monotrimethylsiloxydichlorovanadyl.

Among these compounds, preferred for use in this invention are vanadium tetrahalide, vanadyl trihalide and alkoxydichlorovanadyl, and most preferred are vanadium tetrachloride, vanadyl trichloride and mono-n-butoxydichlorovanadyl.

Used as ether in the process of this invention are the compounds of the general formula: $R^1-O-R^2$ (wherein $R^1$ and $R^2$, which may be same or different from each other, respresent respectively a hydrocarbon group with 1 to 12 carbon atoms, and $R^1$ and $R^2$ may be bonded together to form a ring), and such compounds include, for example, aliphatic ethers such as diethyl ether, diisopropyl ether, di-n-propyl ether, isopropylethyl ether, di-n-butyl ether, ethyl-n-butyl ether, di-n-amyl ether, di-n-octyl ether, di-n-decyl ether and di-n-dodecyl ether, alicyclic ethers such as tetrahydrofuran and tetrahydropyran, and aromatic ethers such as diphenyl ether and anisole. It is usually preferred to use an aliphatic ether with 1 to 12 carbon atoms, most preferably diisopropyl ether, di-n-butyl ether or di-n-octyl ether.

According to the process of this invention, the reduction of the halogen-containing compound of vanadium is accomplished in the presence of an ether either (I) by adding an organic aluminum compound or (II) by merely performing a heat treatment without adding said aluminum compound.

Let us first describe the reduction accomplished by adding an organic aluminum compound, or the method (I).

The organic aluminum compounds usable for this purpose of this invention include the compounds of the general formula: $AlR^4_nX_{3-n}$ (wherein $R^4$ is a hydrocarbon group with 1 to 12 carbon atoms, and X is a halogen atom or an alkoxy, trialkylsiloxy or dialkylamino group), and as concrete examples of such compounds, one may cite trialkylaluminum such as triethylaluminum or triisobutylaluminum, dialkylaluminum compounds such as ethylaluminum monochloride, alkylaluminum sesquihalide such as ethylaluminum sesquichloride or ethylaluminum sesquibromide, alkylaluminum dihalide such as ethylaluminum dichloride, alkoxyalkylaluminum such as ethylaluminum monoethoxide, and other compounds such as diethyl(trimethylsiloxy)aluminum, diethyl(N,N-dimethylamino)aluminum or $(C_2H_5)_2AlN[Si(CH_3)_3]_2$, or mixtures of these compounds. Among them, alkylaluminum sesquihalide and alkylaluminum dihalide are preferred, and ethylaluminum dichloride is most preferred.

As regards the amounts of the respective components used in the reducing reaction, the ether is usually used in an amount of 100 to 0.1 times the molar amount of the halogen-containing compound of vanadium while the organic aluminum compound is used in an amount of 10 to 0.05 times the molar amount said vanadium compound, but these amount ranges are not binding in this invention. It was determined, however, that best results are obtained when using the ether component in an amount within the range of 20 to 0.3 times, particularly 10 to 0.5 times, the molar amount of the halogen-containing compound of vanadium, and the organic aluminum compound in an amount within the range of 2 to 0.2 times the molar amount of the vanadium compound.

The reaction is accomplished by mixing a halogen-containing vanadium compound and an organic aluminum compound in the presence of an ether, followed by aging if necessary. The incorporation of the ether component in the reaction system may be accomplished by several methods such as pre-mixing the ether component with the halogen-containing vanadium compound or with the organic aluminum compound, or by mixing the three components simultaneously, but usually the first-said method or a method in which an ether compound is pre-mixed with both the vanadium compound and the organic aluminum compound respectively is recommended for its ease in to practice. Since combination of an ether and a halogen-containing vanadium compound or an organic aluminum compound produces a coordination compound, such mixing is accomplished with generation of heat, so that it is desirable to perform such mixing with cooling. A heat treatment may be practiced after mixing.

The temperature employed for mixing and reaction of a halogen-containing vanadium compound and an organic aluminum compound is not limited to any specific range, and such reaction may be accomplished over a wide temperature range spanning from as low as −80° C. to a high temperature of around 150° C., but usually a better result is obtained by using a relatively low temperature. The preferred range of such temperature is usually from −60° C. to 90° C., most preferably 0° C. to 50° C.

The reaction is preferably followed by aging. The aging temperature may be equal to the above-said reaction temperature or higher, but in case no solid catalyst component is precipitated from the mixing reaction, it is recommended to use a temperature at which the solid catalyst component is induced to precipitate as further described later. The aging time is usually from 5 minutes to 3 hours or may be longer.

In the reaction of this invention, it is possible to use a reagent directly, as is, for the reaction, but it is more practical to use a suitable diluent, for example an inert hydrocarbon solvent such as hexane, heptane, benzene, toluene or the like. It is advantageous to use the same solvent as employed for the polymerization.

The reaction may be accomplished in the following two ways:

(1) A halogen-containing vanadium compound and an organic aluminum compound are mixed and reacted in the presence of an ether to prepare a homogenous solution, and then this solution is subjected to a heat treatment to produce the solid catalyst.

(2) The solid catalyst is produced simultaneously with the mixing reaction of a halogen-containing vanadium compound and an organic aluminum compound in the presence of an ether. The proper choice as between procedures (1) and (2) above depends on the mixing ratio of the halogen-containing vanadium compound and organic aluminum compound, kind and amount of the ether used, reaction temperature, and kind and amount of the diluent used. Generally, however, a solution with a higher degree of homogeneity is obtained from using a greater amount of ether and a lower reaction temperature. Therefore, for practicing the reaction according to the procedure (1), it is desirable to select a specific combination of the ether/vanadium compound/organic aluminum compound molar ratio and reaction temperature, and generally, it is preferred to use the lowest possible reaction temperature, greatest possible amount of ether and smallest possible amount of organic aluminum compound. For instance, when carrying out the reaction at an extremely low temperature such as −60° C., if the molar ratio of ether/halogen-containing vanadium compound (hereinafter abbreviated as ether/V) is greater than 0.5, no limitation is placed on the amount of the organic aluminum compound used for the reaction, but when carrying out the reaction at around room temperature (about 25° C.), it is desirable to regulate the molar ratio of organic aluminum compound/halogen-containing vanadium compound (hereinafter abbreviated as Al/V) within the range of 0.05 to 1 when the ether/V molar ratio is 0.5 to 1, within the range of 0.05 to 4 when the ether/V molar ratio is 1 to 3, and within the range of 0.05 to equimolar with ether when the ether/V molar ratio is greater than 3. In case the reaction temperature is fairly higher than room temperature, for example 60° C., it is desirable that the ether/V molar ratio be greater than 3 and the Al/V molar ratio be within the range of 0.05 to half the molar quantity of the ether.

There is also a tendency that the solid catalyst component becomes more liable to separate out when using a smaller amount of ether, a greater amount of organic aluminum compound and a higher reaction temperature. Therefore, for practicing the reaction according to procedure (2), it is desirable to react the materials at a temperature higher than room temperature while regulating the ether/V/Al molar ratio within or in the vicinity of the range of 1:1:0.5 to 1:1:5.

In procedure (1), it is necessary to precipitate the solid catalyst component during the aging treatment which is performed under heating at a temperature suited for causing precipitation of the solid catalyst component, usually 30° to 100° C., preferably 50° to 80° C. In the reaction of procedure (2) aging temperature may be same as the preceding reaction temperature. Of course, aging may also be performed at an elevated temperature in procedure (2).

Procedure (1) may be carried out for example, as follows. When reacting vanadium tetrachloride and ethylaluminum dichloride in a toluene medium using di-n-butyl ether, if the reaction temperature is controlled to stay at 25° to 30° C. and the Al/V ratio (by mole) is fixed at 1.0, a homogenous solution is produced when keeping the ether/V molar ratio higher than 2, and when this homogenous solution is heated to 50° to 80° C., a purple precipitate is produced and a solid catalyst product is obtained.

Thus, the reaction according to procedure (1) has the advantages that it is possible to adjust the precipitation of the solid catalyst component and to control the size of catalyst particles to minimize the particle size distribution of the polymer powder product and to increase its bulk density.

The role of the ether in the reaction mechanism of a halogen-containing vanadium compound and an organic aluminum compound in this invention is unknown, but in view of the facts that the ether content in the produced solid is relatively small and that if the homogenous solution is mixed with a Lewis acid such as titanium tetrachloride, tin tetrachloride, vanadium tetrachloride or aluminum chloride, there is precipitated a solid principally composed of vanadium, it is presumed that the reduction and precipitation mechanism of the vanadium component was changed by the coordination of the ether.

The reduction reaction that is performed by a mere heat treatment without adding any organic aluminum compound (method (II)) will now be described.

The amount of the ether used in such reducing reaction, although not specifically limited, is usually selected within the range of 500 to 0.01 preferably 50 to 0.1 and most preferably 20 to 0.1 moles per mole of the halogen-containing vanadium compound.

The heating temperature is usually within the range of 20° to 200° C., preferably 30° to 200° C. and most preferably 30° to 150° C. for obtaining a high-activity catalyst in a high yield. The heating time is usually longer than 10 minutes, preferably 20 minutes to 10 hours. A shorter heating time results in a reduced solid yield.

The halogen-containing vanadium compound may be heated in the ether without using any solvent. In this case, the ether/vanadium ratio may be substantially within the above-said range, but it is usually preferred to increase the ether/vanadium molar ratio to greater than 10 for allowing more advantageous treatment of the vanadium-containing solid product. It is generally preferred, however, to heat the halogen-containing vanadium compound in a solvent, such as mentioned below, in the presence of an ether. More specifically, a solution prepared by adding a halogen-containing vanadium compound to a solvent is mixed with an ether and then heated. Of course, no restriction is imposed on the order of addition of the solvent, vanadium compound and ether. For example, an organic solvent may be first mixed with an ether and then with a halogen-containing vanadium compound and then heated.

The most preferred halogen-containing vanadium compound used in this invention is vanadium tetrahalide.

The solvent used in the process of this invention is a hydrocarbon such as hexane, heptane, isooctane, kerosine, benzene, toluene, xylene, ethylbenzene, cyclopentane, cyclohexane or cyclooctane, or a halogenated hydrocarbon such as methylene iodide, methylene bromide, chloroform, carbon tetrachloride, ethylene dichloride or chlorobenzene, but the preferred type of hydrocarbon for use in this invention is a saturated aliphatic hydrocarbon, a saturated alicyclic hydrocarbon or an aromatic hydrocarbon. The ether/solvent ratio by volume is usually 1 to 500, preferably 1 to 100.

The heating reduction method allows obtainment of the solid catalyst component in a high yield under moderate conditions. If it is attempted to obtain, vanadium trihalide from vanadium tetrahalide by heating with no ether intermediateion, a fairly high temperature, such as 200° C., is required for obtaining the solid catalyst component in a high yield, and also the obtained product is low in activity in olefin polymerization. On the other hand, according to the heating reduction method of this invention, it is possible to obtain, in a high yield, the high-activity solid catalyst at a moderate reaction temperature, such as 60° C.

According to the present invention, the reduction of a halogen-containing vanadium compound is accomplished according to either of the above-said methods (I) or (II) to prepare a reduced reaction mixture, and this reaction mixture is then subjected to separation by a suitable method such as decantation, filtration or centrifugal separation. The separated product is preferably dried under reduced pressure or washed with an inert hydrocarbon solvent such as hexane, heptane, benzene or toluene to remove the by-products and unreacted material and then used for olefin polymerization in combination with an organic aluminum compound mentioned later. When washing the reaction product with an inert hydrocarbon solvent, it is recommended to select the same solvent as employed for the polymerization reaction.

The organic aluminum compounds usable as cocatalysts in tthe process of this invention include trialkyl aluminums such as trimethyl aluminum, triethyl aluminum, tripropyl aluminum, triisobutyl aluminum or trioctyl aluminum; dialkyl aluminum monohalides such as dimethylaluminum monochloride or diethylaluminum monochloride; alkylaluminum sesquihalide such as methylaluminum sesquichloride or ethylaluminum sesquichloride; and dialkylaluminum monoalkoxides such as diethylaluminum monoethoxide or diethylaluminum monomethoxide. Most preferred among these types of aluminum compounds for use in this invention are trialkyl aluminum and dialkylaluminum monohalide. The ratio of the solid catalyst of the present invention and cocatalyst, as calculated in terms of Al/V molar ratio, is usually 0.1 to 100, preferably 1 to 10.

The thus prepared catalyst system is used for the polymerization of olefins. Among the olefins usable in the process of this invention are α-olefins such as ethylene, propylene, butene-1, pentene-1 and octene-1. These olefins may be mixed and copolymerized. The process of this invention is convenient for the preparation of the ethylene homopolymers or ethylene copolymers containing other α-olefin units of up to 10 weight %, preferably up to 5 weight %. The polymerization can be accomplished either by solution polymerization or slurry polymerization performed in an inert solvent or by gas-phase polymerization carried out without presence of any solvent, but usually the polymerization is conducted in the presence of an inert solvent by suppling an olefin or olefin mixture while maintaining the predetermined ranges of temperature and pressure.

Preferred examples of the inert solvents usable in this invention are aliphatic hydrocarbons such as pentane, hexane, heptane, octane or isooctane, alicyclic hydrocarbons such as cyclopentane or cyclohexane, and aromatic hydrocarbons such as benzene or toluene.

The polymerization reaction is usually carried out at a temperature within the range of room temperature to 200° C. and under a pressure within the range of normal pressure to 100 atm.

It is to be noted that, in the process of this invention, presence of hydrogen in the polymerization reaction zone proves helpful for obtaining a polymer of the desired molecular weight owing to the molecular weight adjusting effect of hydrogen. The amount of hydrogen to be introduced into the reaction zone should be suitably determined depending on the polymerization conditions, desired molecular weight of the polyolefin to be produced and other factors.

As described above in detail, the catalyst system used in the process of this invention has an extremely high catalytic activity, so that when olefins are polymerized according to the process of this invention, it is possible to dispense with the catalyst removal step, this providing an eminent industrial advantage.

The process of this invention is described in further detail hereinbelow by way of examples thereof, but this invention is not limited to these examples but may be embodied in various other ways without departing from the scope and principle of the invention.

In the following Examples, the values of Melt Index (hereinafter referred to as "MI") were determined according to ASTM-D12387T, and polymerization activity K of the catalyst was measured from the following calculation: K=(amount of polymer, gr)/(amount of catalyst, gr)·(hr)·(ethylene pressure, kg/cm$^2$).

EXAMPLE 1

(1) Preparation of catalyst 100 ml of dehydrated and deoxygenated refined toluene and 45 mmol of vanadium tetrachloride were put into a 300-cc four-necked flask which had been dried and displaced with purified nitrogen gas, and to this mixed solution was gradually added 135 mmol of di-n-butyl ether. Heat was evolved upon addition of the ether, but the solution was cooled to maintain its temperature below 30° C. After the end of the ether addition, the mixed solution was agitated at room temperature for 30 minutes and then a 50 vol% toluene solution of ethylaluminum dichloride was added dropwise to the solution in an amount of 45 mmol calculated in terms of aluminum component. The reaction temperature was maintained at about 25° C. After completion of dropwise addition of said toluene solution, the mixed solution was aged at 25° C. for one hour. The reaction solution presented a slightly purplish brown color. This solution was further aged for an additional one hour by elevating the temperature to 60° C., whereby a purple precipitate was produced. The precipitate was washed repeatedly with normal hexane by means of decantation until no more elute was obtained. Then hexane was distilled off under reduced pressure to obtain 8.9 gr of catalyst powder. This powder contained 28 wt% of vanadium.

(2) Polymerization 500 ml of purified normal hexane, 10 mg of the catalyst prepared in (1) above and 0.2 mmol of triisobutyl aluminum as a cocatalyst were fed into a dried and nitrogen-displaced 1-liter capacity stainless autoclave, and the temperature was elevated to 90° C. Refined hydrogen gas was introduced into the autoclave to adjust the total pressure to 2 kg/cm$^2$ gauge, and then refined ethylene gas was introduced to commence the polymerization. Ethylene gas alone was added during the polymerization to maintain the total pressure at 12 kg/cm$^2$ gauges, and the polymerization was conducted at 90° C. for 1 hour. The polymerization reaction was then stopped by forcibly introducing ethyl alcohol. After cooling, polyethylene powder was taken out of the autoclave, and after adding about 0.1% of bis(tertiary butyl) hydroxytoluene as stabilizer, the powder was dried at 80° C. There was consequently obtained 167 gr of white polymer powder with MI of 0.12 g/10 mm. The catalyst activity K was 1,670.

Bulk density of the polymer powder (unit, g/cc, hereinafter referred to as "$\rho_B$" was 0.37, and the particle size distribution of the obtained polymer powder, as measured by way of Rosin-Rammler's distribution parity, was 3.6. The parity is hereinafter represented by "n". The larger the value for n, the narrower is the distribution. $R = 10^{-bD_p^n}$, where $D_p$ is particle size, R is weight fraction of the particles with sizes greater than $D_p$, and b is constant).

EXAMPLES 2-6

Catalysts were prepared according to the same procedure as Example 1-(1) except for change in relative proportions of the respective components, or vanadium tetrachloride, dibutyl ether and ethylaluminum dichloride. As the feed of the vanadium compound was fixed, the feeds of the ether and organic aluminum compound are different from those in Example 1-(1). The polymerization was carried out according to the procedure of Example 1-(2). The results are shown comprehensively in Table 1.

EXAMPLES 7-8

Catalysts were prepared according to the process of Example 1-(1) but by using benzene and normal hexane as diluent, and the polymerization was performed by following the procedure of Example 1-(2), obtaining the results shown in Table 2.

EXAMPLES 9-11

Catalysts were prepared and polymerized by following the process of Example 1 but by varying the kind of ether used, obtaining the results shown comprehensively in Table 3.

EXAMPLE 12

A polymerization was performed according to the procedure of Example 1-(2) by using the catalyst prepared in Example 1-(1). The reaction was carried out by using ethylene gas previously mixed with butene-1 and maintaining the butene-1/ethylene molar ratio in the liquid phase at 0.23 during the polymerization reaction. The reaction gave 145 gr of white polymer powder with melt index of 0.53. An infrared analysis revealed that this product is a copolymer containing 2.2 ethyl groups per 1,000 main chain carbon atoms.

Table 1

| Example No. | Proportions (molar ratio) VCl$_4$ | Butyl ether | Ethylaluminium dichloride | Diluent | Polymer Yield (g) | MI g/10min | K | Generation of solid in reaction | $\rho_B$ | n |
| --- | --- | --- | --- | --- | --- | --- | --- | --- | --- | --- |
| 2 | 1 | 1 | 0.5 | Toluene | 175.0 | 0.09 | 1,750 | Produced | 0.30 | 2.2 |
| 3 | 1 | 1 | 0.3 | Toluene | 150.0 | 0.10 | 1,500 | Produced | 0.28 | 2.4 |
| 4 | 1 | 5 | 1 | Toluene | 204 | 0.29 | 2,040 | Not Produced | 0.35 | 3.3 |
| 5 | 1 | 4 | 1 | Toluene | 250 | 0.19 | 2,500 | Not Produced | 0.40 | 4.2 |
| 6 | 1 | 4 | 0.5 | Toluene | 221 | 0.21 | 2,210 | Not Produced | 0.38 | 3.8 |

Table 2

| Example No. | Proportions (molar ratio) VCl$_4$ | Butyl ether | Ethylaluminum dichloride | Diluent | Polymer yield (g) | MI g/10min | K | Generation of solid in reaction | $\rho_B$ | n |
| --- | --- | --- | --- | --- | --- | --- | --- | --- | --- | --- |
| 7 | 1 | 1 | 0.5 | Benzene | 131.0 | 0.15 | 1,310 | Produced | 0.30 | 2.2 |
| 8 | 1 | 1 | 0.5 | Hexane | 145 | 0.40 | 1,450 | Produced | 0.31 | 2.1 |

Table 3

| Example No. | Ether | Proportions (mol. ratio) VCl$_4$:ether:ethylaluminum dichloride | Diluent | Polymer yield (g) | MI g/10min | K | Generation of solid in reaction |
| --- | --- | --- | --- | --- | --- | --- | --- |
| 9 | Isoamyl ether | 1:3:1 | Toluene | 160 | 0.24 | 1,600 | Not produced |
| 10 | N-butyl-ethyl ether | 1:3:1 | " | 170 | 0.10 | 1,700 | Not produced |
| 11 | N-octyl ether | 1:3:1 | " | 125 | 0.32 | 1,250 | Not produced |

EXAMPLE 12

A catalyst was prepared according to the method of Example 1-(1) by using vanadyl trichloride (VOCl$_3$) instead of vanadium tetrachloride. A deep bluish purple solid catalyst composition was obtained. The polymerization according to the method of Example 1-(2) by using the said catalyst composition gave 120 gr of polymer with MI=0.08 g/10 min. Catalyst activity K was 1,200.

EXAMPLE 13

A catalyst was prepared according to the method of Example 1-(1) by using mono-n-butoxy-dichlorovanadyl (VOCl$_2$(OC$_4$H$_9$)) instead of vanadium tetrachloride, and the polymerization according to the method of Example 1-(2) by using this catalyst gave 183 gr of polymer with MI=0.46. The catalyst activity K was 1,830.

EXAMPLE 14

10 ml of dehydrated and deoxygenated refined hexane and 45 mmol of vanadium tetrachloride were put into a 300-cc four-necked flask which had been dried and displaced with refined nitrogen gas, and to this solution was gradually added 45 mmol of n-butyl ether. This was followed by gradual addition of 30 mmol of ethylaluminum sesquichloride while maintaining the flask temperature at 25° C. A purple precipitate was produced with addition of the aluminum compound. After completion of the reaction, the reaction product was aged at 25° C. for one hour and washed with normal hexane, and then hexane was distilled off under reduced pressure to obtain 9.2 gr of a purple solid product.

When this catalyst product was used for polymerization in the manner of Example 1-(2), there was obtained 135 gr of a corresponding polymer with MI of 0.21. Catalyst activity K was 1,500.

EXAMPLE 15

A catalyst was prepared by following the same process as Example 1-(1) except for use of ethylaluminum monochloride instead of triisobutylaluminum as cocatalyst, and this catalyst was used for polymerization performed after the manner of Example 1-(2).

There was consequently obtained 112 gr of a polymer with MI=0.22. The catalyst activity K was 1,120.

EXAMPLE 16

(1) Preparation of catalyst 1 mol of ethylaluminum dichloride was diluted with the equal volume of refined normal hexane, and then 1 mol of di-n-butyl ether was added dropwise gradually to this solution. Heat was evolved due to coordination of the ether to elevate the temperature, but the solution was cooled to keep its temperature below 50° C.

200 cc of refined hexane and 20 mmol of vanadium tetrachloride were put into a dried and nitrogen-displaced 300-ml-capacity four-necked flask, and then 30 mmol of the alkyl-aluminum-ether complex solution was gradually added dropwise into the mixed solution. The reaction temperature was 27° to 35° C. and the reaction time was 30 minutes. There was produced a precipitate which was initially brown in color but later changed into purple. This catalyst slurry was aged at room temperature for 2 hours and then washed with refined normal hexane until the elution of the Cl component completely ceased. Drying of the product under reduced pressure gave 4.4 gr of a catalyst comprising 25.9 wt% of vanadium, 55.5 wt% of chlorine and 2.5 wt% of aluminum as determined by a chemical analysis.

(2) Polymerization

A 1-liter-capacity stainless autoclave was dried and displaced with nitrogen and then fed with 500 ml of refined normal hexane, 7 mg of the above catalyst and 0.12 mmol of triisobutylaluminum, followed by pressurization with hydrogen. After elevating the temperature to 90° C., the partial pressure of hydrogen was set to 2 kg/cm$^2$ gauge and then ethylene was further introduced to 10 kg/cm$^2$ gauge to commence the polymerization. Thereafter, ethylene gas alone was supplied to keep the total pressure constant and the polymerization was performed for one hour. The polymerization was stopped by feed of ethanol under pressure, and the entire mixture was cooled. Polyethylene was separated from the hexane solvent, and after adding about 0.1 wt% of bis-t-butylhydroxytoluene, the mixture was dried at 80° C., obtaining 96 gr of white powdery polyethylene with MI of 1.10. The catalyst activity K was 1,350.

EXAMPLE 17

20 mmol of vanadium tetrachloride and 30 mmol of butyl ether complex of ethylaluminum dichloride were reacted at −60° C. by using the apparatus of Example 16-(1). A brown solution was obtained, but little solid product was formed. As the temperature rose up gradually, there was produced a dark-brownish precipitate. 2-hour aging of this product at 0° C., followed by the same treatment as Example 12-(1), gave 4.5 gr of a slightly brownish purple solid.

When this catalyst was subjected to a polymerization according to the procedure of Example 16-(2), there was obtained 145 gr of polyethylene with MI of 0.9. The activity K of this catalyst was 2,100.

EXAMPLE 18

The mixture of 10 mmol of vanadium tetrachloride and 10 mmol of vanadium trioxychloride was reacted with 30 mmol of butyl ether complex of ethylaluminum dichloride according to the process of Example 16-(1) to obtain 5.2 gr of a dark-purplish catalyst having the composition of 26.2 wt% vanadium, 50.5 wt% chlorine and 2.9 wt% aluminum. The polymerization according to the method of Example 16-(2) by using this catalyst gave 92.4 gr of polyethylene with MI of 0.05. The catalyst activity K was 1,300.

EXAMPLE 19

A polymerization was performed according to the method of Example 16-(2) by using the catalyst of Example 16-(1). The reaction was carried out by using ethylene gas previously mixed with butene-1 as monomer and by maintaining the butene-1/ethylene ratio in the liquid phase at 0.2 during the polymerization reaction. There was consequently obtained 73 gr of polyethylene with melt index of 2.7. An infrared analysis of this polymer product revealed that it was a copolymer containing 1.9 ethyl groups per 1,000 main chain carbon atoms.

EXAMPLE 20

200 cc of toluene and 20 mmol of vanadium tetrachloride were fed into a 300-ml four-necked flask, followed by dropwise addition of 20 mmol of di-n-butyl ether and further followed by similar dropwise addition of 20 mmol of butyl ether complex of ethylaluminum dichloride prepared in Example 16-(1). There was gradually produced a purple solid. The reaction temperature was 25°–30° C. and the reaction time was 30 minutes. The product was aged at 40° C. for 2 hours and washed with normal hexane, obtaining 4.7 gr of a purple catalyst.

When this catalyst was used for polymerization according to the procedure of example 16-(2), there was obtained 85 gr of white polyethylene powder with MI of 1.2. The catalyst activity K was 1,200.

COMPARATIVE EXAMPLE 1

A catalyst was prepared by following the process of Example 1-(1) but without adding di-n-butyl ether. In this case, a solid component was precipitated simultaneously with addition of ethylaluminum dichloride, but the reaction conditions including aging were all same as in the case of Example 1-(1). There was obtained 10.6 gr of slightly reddish purple powder containing 20.2 wt% of vanadium, 5.8 wt% of aluminum and 69.6 wt% of chlorine. A polymerization conducted according to the method of Example 1-(2) by using this catalyst provided 43 gr of polymer with MI of 0.07. The catalyst activity K was 430.

EXAMPLE 21

(1) Preparation of catalyst 50 ml of dehydrated and deoxygenated refined toluene and 30 mmol of vanadium tetrachloride were put into a 300-ml four-necked flask which had been dried and displaced with purified nitrogen gas, and to this solution was gradually added 120 mmol of di-n-butyl ether.

As addition of ether evolved heat, the solution was cooled to maintain the temperature below 30° C. After addition of the ether had ended, the mixture was agitated at room temperature for 30 minutes, followed by an additional 2-hour agitation at 60° C., consequently producing a purple precipitate.

This product was washed repeatedly with normal hexane by decantation until no elute was obtained. Then normal hexane was distilled off under reduced pressure to obtain 3.3 gr of catalyst powder. This powder contained 21.0 wt% of vanadium and 42.5 wt% of chlorine. The main component was a compound corresponding to $VCl_3$, and the vandium yield was 45%.

(2) Polymerization 500 ml of refined normal hexane, 8 mg of the catalyst produced in (1) above and 0.16 mmol of triisobutylaluminum (as cocatalyst) were introduced into a dried and nitrogen-displaced 1-liter-capacity stainless autoclave, and the temperature was raised to raise 90° C. Then purified hydrogen was added to the pressure to 2 $kg/cm^2$ and refined ethylene gas was introduced to commence the polymerization. The polymerization was performed at 90° C. for one hour by supplying ethylene gas to maintain the total pressure at 12 $kg/cm^2$ gauge throughout the reaction.

The polymerization was stopped by charging ethyl alcohol under pressure. After cooling, polyethylene powder was taken out of the autoclave, and it was mixed with about 0.1 wt% of bis(tertiary butyl) hydroxytoluene as stabilizer and then dried resultantly at 80° C. There was resultantly obtained 210 gr of white polymer powder with MI of 0.10 g/10 min. The catalyst activity K was 2,550.

EXAMPLES 22–23

Catalysts were prepared according to the process of Example 21-(1) but by using the solvents shown in Table 4. The polymerization was also carried out in the same way as Example 21-(2), obtaining the results shown in Table 4.

EXAMPLES 24–26

Catalysts were produced by following the same procedure as Example 21-(1) except for change in ratio of vanadium tetrachloride to butyl ether and use of benzene as solvent. As the loading of vanadium tetrachloride was fixed, the ether loading was different from that in Example 21-(1). The polymerization was carried out after the manner of Example 21-(2). The results are collectively shown in Table 5.

EXAMPLES 27–29

Catalysts were produced in the same way as Example 21-(1) except for change of the type of ether as shown in Table 6, use of benzene as solvent and change of vanadium tetrachloride/ether molar ratio to 1:2, and the polymerization was carried out after the manner of Example 21-(2), obtaining the results shown collectively in Table 6.

Table 4

| Example No. | Solvent | Polymer yield (g) | MI | K |
|---|---|---|---|---|
| 22 | Benzene | 184 | 0.12 | 2,300 |
| 23 | Normal hexane | 177 | 0.04 | 2,210 |

Table 5

| Example No. | Proportions (molar ratio) | | Obtained catalyst powder (g) | V (wt %) | Cl (wt %) | V yield (%) | Polymer yield (g) | MI | K |
|---|---|---|---|---|---|---|---|---|---|
| | $VCl_4$ | n-butyl ether | | | | | | | |
| 24 | 1 : | 1 | 4.6 | 32.6 | 65.5 | 98 | 88 | 0.04 | 1,080 |

Table 5-continued

| Example No. | Proportions (molar ratio) VCl4 : n-butyl ether | Obtained catalyst powder (g) | V (wt %) | Cl (wt %) | V yield (%) | Polymer yield (g) | MI | K |
|---|---|---|---|---|---|---|---|---|
| 25 | 1 : 2 | 4.5 | 27.4 | 55.3 | 81 | 102 | 0.06 | 1,240 |
| 26 | 1 : 3 | 4.4 | 25.3 | 51.7 | 73 | 77 | 0.13 | 1,040 |

Table 6

| Example No. | Ether | Polymer yield (g) | Mi | K |
|---|---|---|---|---|
| 27 | Diethyl ether | 120 | 0.08 | 1,520 |
| 28 | Di-n-butyl ether | 100 | 0.10 | 1,200 |
| 29 | Di-normal octyl ether | 79 | 0.12 | 990 |

COMPARATIVE EXAMPLE 2

A catalyst was prepared according to the method of Example 21-(1) but without adding di-normal butyl ether. In this case, the mixture was agitated at 60° C. for 2 hours, producing 0.4 gr of solid powder. This powder contained 27.0 wt% of vanadium and 66.7 wt% of chlorine.

When the polymerization of Example 21-(2) was carried out by using this catalyst, there was obtained 16 gr of polymer with MI of 0.08. The catalyst activity K was 200.

COMPARATIVE EXAMPLE 3

50 gr of vanadium tetrachloride was thermally decomposed under reflux at 148.5° C. in a carbon dioxide gas atmosphere to obtain 5 gr of vanadium trichloride, and ethylene was polymerized according to the method of Example 21-(1) by using 8 mg of the thus obtained solid in place of the catalyst used in that Example. The catalyst activity K was 220.

EXAMPLES 30-35

Catalysts were prepared in the same way as Example 21 except for different vanadium compounds and ethers as shown in Table 7, and ethylene polymerization was carried out by using these catalysts, obtaining the results shown in Table 7.

Table 7

| Example No. | VX4 (mmol) | Ether (mmol) | Solvent (ml) | | K | MI |
|---|---|---|---|---|---|---|
| 30 | VBR4 30 | n-butyl ether 120 | n-hexane | 50 | 2,100 | 0.11 |
| 31 | VCl4 30 | Anisole 120 | n-hexane | 50 | 1,900 | 0.13 |
| 32 | VCl4 30 | n-di-butyl ether 120 | 1,2-di-chloro-ethane | 50 | 1,700 | 0.10 |
| 33 | VCl4 30 | n-di-butyl ether 120 | Chloro-benzene | 50 | 1,100 | 0.11 |
| 34 | VCl4 30 | n-di-butyl ether 300 | — | | 1,000 | 0.16 |
| 35 | VCl4 30 | Tetra-hydro-furan 120 | n-hexane | 50 | 800 | 0.22 |

EXAMPLES 36-40

Catalysts were prepared by following the process of Example 21 but by changing the heating temperature and heating time as shown in Table 8, and ethylene polymerization was carried out by using these catalysts, obtaining the results shown in Table 8.

Table 8

| Example No. | Temp. (°C.) | Time (min) | Yield of obtained solid catalyst component (g) | K | MI |
|---|---|---|---|---|---|
| 36 | 35 | 180 | 2.0 | 2,030 | 0.22 |
| 37 | 60 | 240 | 3.3 | 2,300 | 0.18 |
| 38 | 60 | 30 | 3.1 | 2,780 | 0.18 |
| 39 | 100 | 90 | 3.3 | 2,200 | 0.12 |
| 40 | 150 | 90 | 3.0 | 2,120 | 0.11 |

EXAMPLE 41

Ethylene polymerization was carried out in the completely same way as Example 21-(2) except for use of 0.18 mmol of diethylaluminum chloride instead of 0.16 mmol of triisobutylaluminum. The yield and MI of the obtained polymer were 165 gr and 0.16, respectively. The catalyst activity K was 2,000.

EXAMPLE 42

Ethylene-propylene copolymerization was performed by following the same procedure as Example 21-(2) except that the propylene/ethylene molar ratio in the gaseous phase was maintained at 0.11 during the polymerization reaction. Yield of the powdery polymer product=273 gr. K=3,310. MI=0.21. The polymer contained 2.1 methyl groups per 1,000 main chain carbon atoms.

EXAMPLE 43

The process of Example 21-(1) was repeated but by using 3 mmol of di-n-butyl ether, obtaining 2.2 gr of a solid product. It contained 32.8% of vanadium and 66.2% of chlorine. Ethylene polymerization by use of this solid product according to the method of Example 21-(2) provided 91 gr of polyethylene. K=1,110.

What is claimed is:

1. A process for the preparation of an ethylene homopolymer or copolymer which comprises polymerizing, at room temperature to 200° C., more than 90 wt% of ethylene and less than 10 wt% of other α-olefin by using a catalyst comprising (1) a solid catalyst component separated from a reduced reaction mixture obtained by reducing an organic solvent solution of a halogen-containing compound of vanadium with an organic aluminum compound in the presence of an ether represented by the general formula $R^1$—O—$R^2$, wherein $R^1$ and $R^2$ are hydrocarbon groups of 1 to 12 carbon atoms, $R^1$ and $R^2$ being independent or bound together to form a ring, at −60° to 90° C., wherein said ether is used in an amount of 0.1 to 100 moles per mole of said halogen-containing compound of vanadium and (2) an organic aluminum compound.

2. The process of claim 1 wherein reduction of the halogen-containing compound is effected with simultaneous heating to produce the solid catalyst.

3. The process of claim 1 wherein the reduction of the halogen-containing compound in the presence of an ether results in a homogeneous solution, said process further comprising heating said homogeneous solution to precipitate the solid catalyst.

4. The process of claim 3 wherein said heating is at a temperature of 30° to 100° C.

5. The process of claim 3 wherein said heating is continued for 5 minutes to 3 hours.

6. A process for the preparation of an ethylene homopolymer or copolymer which comprises:
forming an organic solvent solution of a halogen-containing vanadium compound;
admixing said solution, at minus $-60°$ to 90° C., with an organic aluminum compound and an ether represented by the general formula $R^1$—O—$R^2$, wherein $R^1$ and $R^2$ are hydrocarbon groups of 1 to 12 carbon atoms, $R^1$ and $R^2$ being independent or bound together to form a ring, wherein said ether is used in an amount of 0.1 to 100 moles per mole of said halogen-containing vanadium compound, to produce a solid reduction product;
separating said solid reduction product from the remaining solution;
admixing said separated solid reduction product with an organic aluminum compound to produce a catalyst admixture; and
contacting monomers containing more than 90 wt% ethylene and less than 10 wt% of another α-olefin with said catalyst admixture at room temperature to 200° C. for polymerization to produce said homopolymer or copolymer.

* * * * *